United States Patent
Wager et al.

(10) Patent No.: US 8,781,476 B2
(45) Date of Patent: Jul. 15, 2014

(54) CONFIGURATION OF HS-DSCH SERVING CELL CHANGE IMPROVEMENTS

(75) Inventors: Stefan Wager, Espoo (FI); Janne Peisa, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 65 days.

(21) Appl. No.: 12/933,220

(22) PCT Filed: Mar. 6, 2009

(86) PCT No.: PCT/SE2009/050231
§ 371 (c)(1),
(2), (4) Date: Sep. 17, 2010

(87) PCT Pub. No.: WO2009/116929
PCT Pub. Date: Sep. 24, 2009

(65) Prior Publication Data
US 2011/0014917 A1    Jan. 20, 2011

Related U.S. Application Data

(60) Provisional application No. 61/038,222, filed on Mar. 20, 2008.

(51) Int. Cl.
*H04W 36/00*    (2009.01)

(52) U.S. Cl.
USPC ............ 455/438; 455/432.1; 455/435.2; 455/436; 455/437; 455/441; 370/338; 370/331

(58) Field of Classification Search
CPC ............ H04W 36/0005; H04W 36/0016; H04W 36/0055; H04W 36/0061; H04W 36/24
USPC ........... 455/436–444, 525, 524, 432.1, 435.2; 370/331, 338
See application file for complete search history.

(56) References Cited

U.S. PATENT DOCUMENTS 6,804,212 B1    10/2004  Vallström et al.
7,054,633 B2 *   5/2006  Seo et al. ................. 455/439
(Continued)

FOREIGN PATENT DOCUMENTS

EP    1773009 A2    4/2007
JP    2007502558 A    2/2007
(Continued)

OTHER PUBLICATIONS

3rd Generation Partnership Project. "Improving Reliability of HS-PDSCH Serving Cell Change Procedure." 3GPP TSG-RAN WG1 #52, R1-080815, Sorrento, Italy, Feb. 11-15, 2008.
3rd Generation Partnership Project. "HS-PDSCH Serving Cell Change Enhancements." 3GPP TSG RAN WG1 Meeting #52, R1-080911, Sorrento, Italy, Feb. 11-15, 2008.
(Continued)

*Primary Examiner* — Nathan Mitchell
(74) *Attorney, Agent, or Firm* — Coats & Bennett, PLLC

(57) ABSTRACT

A cell change procedure for user equipment (UE) situated in a serving cell. An active set of cells comprises a list of cells to which the UE can move from the serving cell. The UE sends a request to a network controller to add at least one further cell to the active set. The UE then receives the requested active set update from the network controller with the further cell and a list of cells to which a modified cell change procedure shall be used for handover. A neighbor cell which is stronger than a current serving cell is detected. This detected stronger neighbor cell is matching with the received list of modified cell change procedure cells, and the modified cell change procedure for the handover to the stronger neighbor cell is applied if the stronger neighbor cell is found matching a cell on the list.

21 Claims, 8 Drawing Sheets

(56) References Cited

U.S. PATENT DOCUMENTS

| | | |
|---|---|---|
| 2004/0121773 A1 | 6/2004 | O'Brien |
| 2005/0105488 A1 | 5/2005 | Raji et al. |
| 2006/0089142 A1* | 4/2006 | Vuorinen et al. ............ 455/436 |
| 2006/0240831 A1* | 10/2006 | Toskala et al. ............... 455/436 |
| 2006/0293055 A1* | 12/2006 | Pirskanen .................... 455/436 |
| 2007/0049278 A1 | 3/2007 | Lindoff et al. |
| 2007/0106924 A1 | 5/2007 | Seidel et al. |
| 2007/0254620 A1 | 11/2007 | Lindqvist et al. |
| 2008/0261599 A1* | 10/2008 | Mohanty et al. ............. 455/436 |

FOREIGN PATENT DOCUMENTS

| | | |
|---|---|---|
| JP | 2009506692 A | 2/2009 |
| RU | 2237363 C2 | 9/2004 |
| RU | 2270526 C2 | 2/2006 |
| WO | 2007025971 A1 | 3/2007 |

OTHER PUBLICATIONS

3rd Generation Partnership Project, "HS-DSCH Serving Cell Change Enhancements", 3GPP TSG RAN #39, Mar. 4-7, 2008, pp. 1-4, Puerto Vallarta, Mexico, RP-080227.

3rd Generation Partnership Project, "Universal Mobile Telecommunications Systems (UMTS); Radio Resource Control (RRC); Protocol Specification", ETSI TS 125 331 V7.7.0, Jan. 2008 (3GPP TS 25.331 version 7.7.0 Release 7), pp. 1-1469.

TSG RAN WG2, "REL-8 CR to TS 25.308 & TS 25.331 on Introduction of HS-DSCH cell change enhancements", TSG-RAN Meeting #42, Dec. 2-5, 2008, p. 1, Athens, Greece, RP-081028.

Wager, S., et al., "Performance evaluation of HSDPA mobility for Voice over IP", Vehicular Technology Conference, VTC2007-Spring, IEEE 65th, Apr. 22-25, 2007, pp. 809-813.

Qualcomm Europe, "Improving Reliability of HS-PDSCH Serving Cell Change Procedure", 3GPP TSG-RAN WG2 #61, Feb. 11-15, 2008, pp. 1-8, Sorrento, Italy, R2-081015.

* cited by examiner

CONFIGURATION OF HS-DSCH SERVING CELL CHANGE IMPROVEMENTS

TECHNICAL FIELD

The present solution relates to a method and arrangement in a telecommunications system, in particular it relates to a method and arrangement for configuring a high speed downlink shared channel (HS-DSCH) serving cell change (HSCC) procedure in a telecommunications system.

BACKGROUND

A Universal Mobile Telecommunications System (UMTS) or third generation (3G) network can be separated into a number of major components, namely one or more core networks which are responsible for setting up and controlling user sessions, and a UMTS radio access network (UTRAN) which controls access to the air interface. The interface between UTRAN and user equipment (UE) is provided by nodes that may be referred to as "Node B" (analogous to base stations in 2G/GSM networks) or base stations. NodeBs are responsible for transmitting and receiving data over the air interface and are controlled by radio network controllers. User and control data is routed between a base station and a core network via the base station and the radio network controllers. The interface between a base station and a radio network controller is referred to as the Iub interface. The interface between two radio network controllers in the same network is referred to as the Iur interface. A Iu interface carries user traffic (such as voice or data) as well as control information, and is mainly needed for soft handovers. Soft handover refers to a feature used by the Code Division Multiple Access (CDMA) and Wideband Code Division Multiple Access (WCDMA) standards, where a user equipment, such as a cell phone, is simultaneously connected to two or more cells (or cell sectors) during a call. On the uplink (user equipment-to-cell-site), all the cell site sectors that are actively supporting a call in soft handover send the bit stream that they receive back to the radio network controller, along with information about the quality of the received bits. The radio network controller examines the quality of all these bit streams and dynamically chooses the bit stream with the highest quality. Again, if the signal degrades rapidly, the chance is still good that a strong signal will be available at one of the other cell sectors that are supporting the call in soft handover.

In UTRAN, the high-speed downlink shared channel (HS-DSCH) does not use soft handover as dedicated channels do. Instead, a procedure called HS-DSCH serving cell change (HSCC) is utilized to make a hard handover. Soft handover is still used for the uplink, and an active set is managed in the same way as for non-high speed user equipment. The active set comprises all cells the user equipment is connected to in uplink soft handover. The user equipment continuously measures the common pilot (CPICH) and comprises a hysteresis to be fulfilled during a certain time (time to trigger). The active set update procedure is schematically illustrated in FIG. 1. The active set update procedure is triggered by measurement report 1a, 1b or 1c, 101 informing the radio network controller 315 that new cells have fulfilled the criterions to be added (measurement report 1a), deleted (measurement report 1b) or replaced (measurement report 1c) in the active set. The measurement report 1a, 1 b, 1c is sent from the user equipment 310 to a network controller 315, e.g. a serving radio network controller SRNC. A serving radio network controller 315 is a type of radio network controller serving particular user equipment 310 and manages the connections towards that user equipment 310. When in HS-DSCH operation, the downlink is not in soft handover. Instead, one of the cells (typically the strongest) in the active set is marked as current HS-DSCH serving cell. The network controller 315 then performs a radio link addition 102, and sets up the required radio links by sending and receiving setup request and response to/from the base stations 350, 307. The network controller 315 transmits the active set update message 105 to the user equipment 310. When the user equipment 310 has received the active set update from the network controller 315, it prepares 106 a processing, i.e. it reads the message and applies the new configuration, e.g. adds or deletes a radio link. The user equipment 310 sends an active set update complete message 107 to the network controller 315 confirming that the active set update was complete. The duration of an active set update procedure may, as an example, be calculated as follows:

$$T_{asu} = Ttrig1a + 2*T_{Uu} + 2*T_{Iub}$$

where
  Ttrig1a=Time to trigger measurement report 1a=320 ms
  Tu$_{Uu}$=Uu (Radio Interface) delay=100 ms
  T$_{Iub}$=Iub (Radio Network Controller—NodeB Interface) delay=10 ms
  T$_{asu}$=Time for active set update The signalling sequence for a (regular) HSCC procedure for hard handover is schematically shown in a combined flow and signalling diagram in FIG. 2. The user equipment 310 performs a handover evaluation 200 to determine whether a handover shall be performed. This is triggered by a neighbour cell (target cell) being stronger than of the current cell (serving cell). A measurement report 1d is then sent 201 from the user equipment 310 to the network controller 315, e.g. the serving radio network controller (SRNC), indicating that another cell in the active set has become the strongest one. As an example, the measurement report 1d is triggered to be sent from the user equipment when the measured common pilot channel level (CPICH) of the target cell is stronger than the current cell by a certain hysteresis for a given time, governed by a parameter Ttrig1d (time to trigger measurement report 1d).

When not considering possible processing delays in the network controller 315 and the user equipment 310 (i.e. in simulation), the delay of the cell change procedure, T$_{cc}$, used may, as an example, be calculated as follows:

$$T_{cc} = Ttrig1d + T_{Uu} + 2*T_{Iub} + T_{ActivationTime}$$

where
  T$_{cc}$=Delay of cell change procedure
  Ttrig1d=time to trigger measurement report 1d
  T$_{Uu}$=Uu (Radio Interface) delay=100 ms
  T$_{Iub}$=Iub (Radio Network Controller—NodeB Interface) delay=10 ms
  T$_{ActivationTime}$=Activation time When the network controller 315 receives the measurement report 1d indicating the existence of this stronger cell, the network can take the decision to change the serving cell, i.e. it takes a handover decision 202. When a cell change is triggered, the network controller configures source and target base stations (shown as only one base station in FIG. 2) with the new configuration and configures the Iub transport bearer. The network controller 315 sends a radio link reconfiguration prepare 203 message to the base stations 305, 307, and receives in return a radio link reconfiguration ready message 204. When both base stations 305, 307 (serving and target) have acknowledged the configuration, the network controller 315 calculates 205 the activation time for the new configuration in case the switch to the new configuration is a synchronized procedure, meaning that the user equipment 310 and the network controller 315 i.e. serving network controller, shall move to the new configuration at the same time. The activation time is relative to a connection frame number (CFN). An offset is needed to cover for the time it takes to transmit the re-configuration messages 206 to both the user equipment 310 and the base stations 350, 307. The network controller 315 sends a physical channel reconfiguration message 207 to the user equipment 310. The user equipment 310 performs a processing 206, i.e. it reads the message from the network controller 315 and applies the new configuration, e.g. adds or deletes a radio link 208 for the handover and sends a physical channel reconfiguration message 209 to the network controller 315.

There is however a problem for user equipments 310 travelling at very high speed, since the link quality of the source cell (i.e. serving cell) may degrade before the cell change procedure to the target cell is completed. If this happens before the network controller 315 is able to successfully transmit the Physical Channel Reconfiguration message 209, the network controller 315 will no longer be able to reach the user equipment 310 and the call will be dropped.

Enhancements to the HS-DSCH serving cell change procedure are consequently required regarding radio protocol procedures and structures, Iub/Iur protocols and User equipment, base station and radio resource management (RRM) performance requirements.

Several improvements exist to the high speed serving cell change procedure to reduce drop rates, some of which are shortly listed below:
  Transmit of the handover command in the target cell.
  Proactive retransmissions for delay sensitive packets such as signalling radio bearer (SRB) packets.
  Bi-casting handover commands from both the serving Node B and the target Node B Any improvements and modifications, including those mentioned above, to the regular HS-DSCH serving cell change procedures as exemplified in FIG. 2 are hereinafter referred to as modified cell change procedures within the context of the description of the present solution. Common for the above improvements is that they come at a certain cost in system performance. Bi-casting reduces capacity on radio and transport network, proactive retransmissions cost radio resources, and the target cell re-pointing requires resource reservation in all cells in the active set.

SUMMARY

It is thus an object of the present solution to provide an enhanced solution for configuring a high-speed downlink shared channel (HS-DSCH) Serving Cell Change (HSCC) procedure in a communications system.

At least one of the above objects is achieved with the methods or node according to the example aspects and embodiments of the solution herein described.

Further objects and advantages are evident from the following.

The objectives set forth above are achieved by providing, in a first aspect of the present solution, a method in a user equipment for configuring a cell change procedure to be used for handover in a wireless communication network. The user equipment being situated in a serving cell. The user equipment comprising an active set of cells, which active set of cells comprises a list of cells to which the user equipment can move from the serving cell The method comprising the following steps:

sending a request to a network controller comprised in the wireless communication network to add at least one further cell to the active set;
receiving the requested active set update from the network controller, the active set update comprising the at least one further cell to be added to the active set and a list of cells to which a modified cell change procedure shall be used for handover;
detecting a neighbour cell which is stronger than a current serving cell;
matching the detected stronger neighbour cell with the received list of modified cell change procedure cells; and
applying the modified cell change procedure for the handover to the stronger neighbour cell if the stronger neighbour cell is found matching a cell on the list.

In an alternative embodiment of the method according to the present solution the method further comprises the step of applying a regular cell change procedure for the handover if the stronger neighbour cell is found not matching.

In another alternative embodiment of the method according to the present solution the modified cell change procedure comprises sending the cell change command over the stronger neighbour cell.

In yet another alternative embodiment of the method according to the present solution the active set update message is transmitted via radio resource control signalling.

In still another alternative embodiment of the method according to the solution the cells to which a modified cell change procedure is applied is signalled by including an information element "Target cell preconfiguration information" to the corresponding "Radio link addition information".

In an alternative embodiment of the method according to the present solution the stronger cell is detected by a user equipment measuring a higher signal strength in a neighbour cell compared to that of the current serving cell.

In still an alternative embodiment of the method according to the solution the measured signal is a common pilot.

In a further alternative embodiment of the method according to the present solution the cell change procedure is a high speed serving cell change procedure.

In a second aspect of the present solution there is provided a method in a network controller for configuring a cell change procedure to be used for handover in a wireless communication network. The network controller is arranged to be connected to a user equipment situated in a serving cell. The user equipment comprising an active set of cells, which active set of cells comprises a list of cells to which the user equipment can move from the serving cell. The method comprising the following steps:

receiving a request from a user equipment to add at least one further cell to an active set; and
sending an active set update to the user equipment, the active set update comprising a list of cells to be added to the active set and a list of cells to which a modified cell change procedure shall be used for handover.

In alternative embodiment of the method according to the second aspect of the present solution the cell change procedure is a high speed serving cell change procedure.

In a third aspect of the present solution there is provided an arrangement in a user equipment. The user equipment being comprised in a wireless communication network, wherein the user equipment arrangement is arranged to configure a cell change procedure to be used for handover in the network. The user equipment being arranged to be connected to a network controller. The user equipment being situated in a serving cell, and the user equipment comprising an active set of cells, which active set of cells comprises a list of cells to which the user equipment can move from the serving cell (306). The user equipment arrangement further comprises:
- a sender configured to send a request to the network controller through the an interface to add at least one further cell to an active set;
- a receiver configured to receive an active set update from the network controller, the active set update comprising a list of cells to be added to the active set and a list of cells to which a modified cell change procedure shall be used for handover, the lists being stored in a memory unit;
- a detector configured to detect a neighbour cell which is stronger than a current serving cell;
- a processor configured to match the detected stronger neighbour cell with the received list of modified cell change procedure cells and to apply the modified cell change procedure for the handover to the stronger neighbour cell (308) if the stronger neighbour cell is found matching a cell on the list.

In an alternative embodiment of the third aspect of the present solution the processor is further arranged to apply a regular cell change procedure for the handover if the stronger neighbour cell is found not matching.

In another alternative embodiment of the third aspect of the present solution the modified cell change procedure comprises sending the cell change command over the stronger neighbour cell.

In still an alternative embodiment of the third aspect of the present solution the active set update message is transmitted via radio resource control signalling.

In still an alternative embodiment of the third aspect of the present solution the cells to which a modified cell change procedure is applied is signalled by including an information element "Target cell preconfiguration information" to the corresponding "Radio link addition information".

In another alternative embodiment of the third aspect of the present solution the stronger cell is detected by a user equipment measuring a higher signal strength in a neighbour cell compared to that of the current serving cell.

In a further alternative embodiment of the third aspect of the present solution the measured signal is a common pilot.

In still an alternative embodiment of the third aspect of the present solution the cell change procedure is a high speed serving cell change procedure.

In a fourth aspect of the present solution there is provided an arrangement in a network controller. The network controller being comprised in a wireless communication network, wherein the network controller is arranged to configure a cell change procedure to be used for handover in the wireless communication network. The network controller being arranged to be connected to a user equipment situated in a serving cell. The user equipment comprising an active set of cells, which active set of cells comprises a list of cells to which the user equipment can move from the serving cell. The network controller arrangement further comprises
- a receiver configured to receive a request from a user equipment to add at least one further cell to an active set; and
- a sender configured to send an active set update to the user equipment, the active set update comprising a list of cells to be added to the active set and a list of cells to which a modified cell change procedure shall be used for handover.

In an alternative embodiment of the fourth aspect of the present solution the cell change procedure is a high speed serving cell change procedure.

In a fifth aspect of the present solution there is provided a computer program stored in a computer readable memory in a node in a wireless communication network. The program being arranged to configure a cell change procedure to be used for handover in the wireless communication network. The program comprising instruction sets for:
- sending a measurement report with requests to add at least one further cell to an active set;
- receiving an active set update from the network controller, the active set update comprising a list of cells to be added to the active set and a list of cells to which a modified cell change procedure shall be used for handover;
- detecting a neighbour cell which is stronger than a current serving cell;
- matching the detected stronger neighbour cell with the received list of modified cell change procedure cells; and for
- applying the modified cell change procedure for the handover to the stronger neighbour cell if the stronger neighbour cell is found matching a cell on the list.

Since a detected stronger neighbour cell is matched with the received list of modified cell change procedure cells the, the modified cell change procedure is made configurable on a cell level. In this way, such improvements are used only in cells where problems with cell change procedure performance are monitored, and thus the cost of the improvements in terms of system capacity may be minimized. Another advantage of this is that a modified cell change procedure is adaptable dependent on target cell performance.

The features described above in relation to the method according to the solution may, where applicable, also be implemented in an arrangement according to the solution with the same advantages as described in relation to the method.

It goes without saying that the above aspects of the solution may be combined in the same embodiment.

BRIEF DESCRIPTION OF THE DRAWINGS

The solution will now be further described in more detail in the following detailed description by reference to the appended drawings illustrating embodiments of the solution and in which.

DETAILED DESCRIPTION

One or more embodiments herein relate to a method that allows known high speed downlink shared channel (HS-DSCH) serving cell change (HSCC) improvements to be applied only to certain cells, e.g. cells in which certain performance problems have been detected. In the following, the term cell change procedure is used for high speed downlink shared channel (HS-DSCH) serving cell change (HSCC) procedure. The necessary information for this is transmitted to the user equipment 310 (UE) either via the active set update procedure, or via the broadcast control channel. Embodiments herein thus make use of cell change improvements configurable on a cell level. In this way, such improvements are used only in cells where problems with cell change performance are monitored, and thus the cost of the improvements in terms of system capacity may be minimized. It also improves cell change reliability in difficult cells. In more detail, this description provides examples of two alternative embodiments for configuration of whether regular or modified (i.e. special or fast) cell change procedure shall be applied by a user equipment in handover to a certain cell. In the following, the term regular cell change procedure and modified cell change procedure will be used. The particular cell change improvement that is selected is in principle transparent to the present solution.

The problem solved is to make the use of cell change improvements configurable on a cell level. A user equipment sends a request to the network to add new cells to an active set. As mentioned above, the active set comprises all cells the user equipment is connected to in uplink soft handover. The user equipment then receives in return an active set update comprising a list of cells to be added to the active set and a list of cells to which a modified cell change procedure shall be used for handover. When a user equipment detects that a cell in the active set is stronger than the current serving cell, thus fulfilling the criteria for event 1d, it matches the indicated new target cell with the received list of cells to which the modified cell change procedure shall be used. If the target cell is found matching on the list, the modified cell change procedure is applied for the handover to the target cell.

Figure 3:
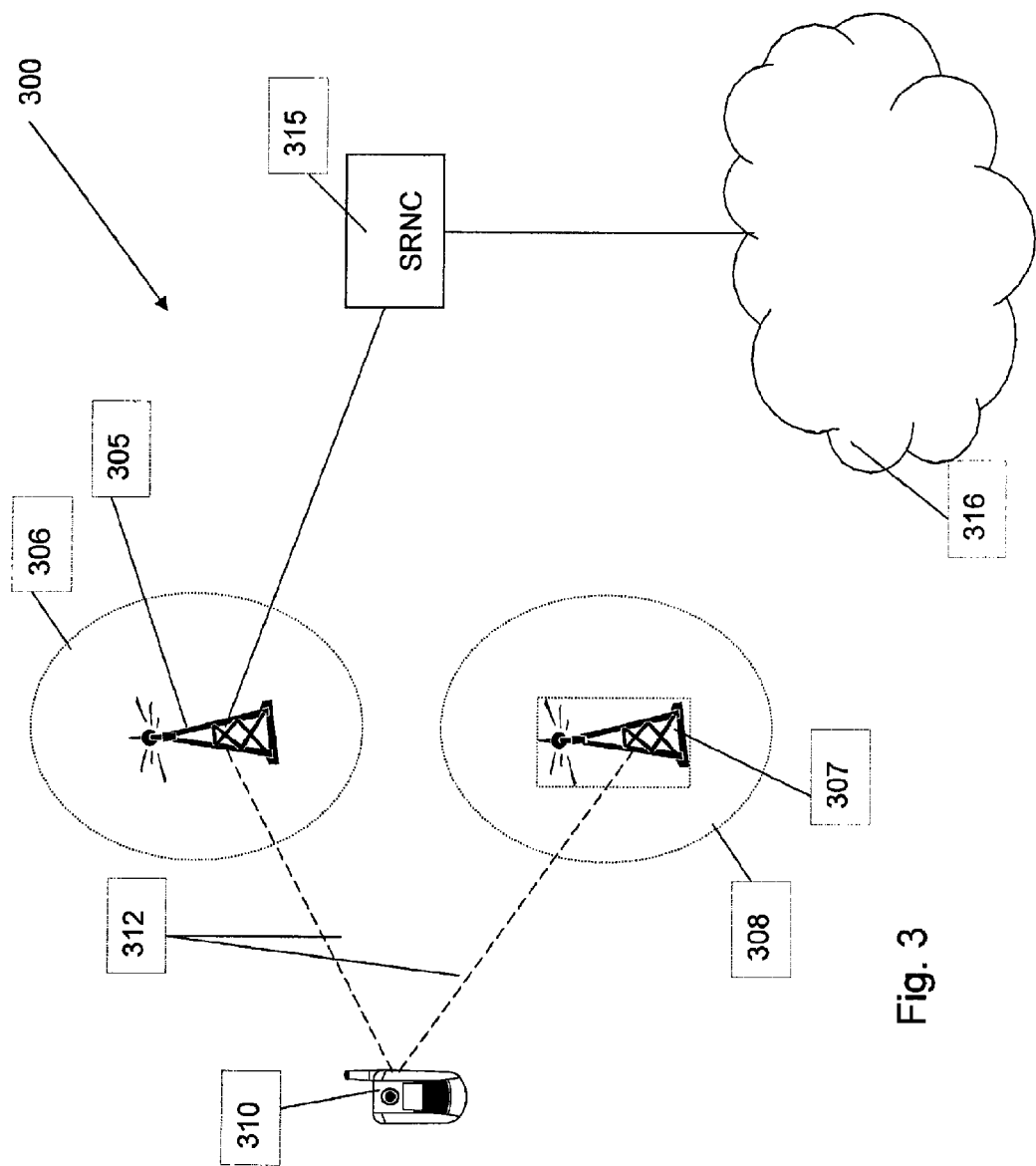
FIG. 3 is a schematic block diagram illustrating a wireless communication network.

FIG. 3 shows a wireless communication network 300, using technologies such as e.g. UTRAN. The wireless communication network 300 comprises base stations serving cells, such as a base station 305 serving a cell 320 and a base station 307 serving cell 308. The base stations 305 and 307 are radio base stations, e.g. in a radio access network, and may be referred to as NodeB. The base station 305 is arranged to wirelessly communicate with a user equipment 310 via e.g. radio frequency transmitters and receivers which also may be responsible for transmitting and receiving data over an air interface 312. The user equipment 310 may be referred to as a node device. The wireless communication network 300 further comprises a radio network controller 315 adapted to control the base stations 305, 307 and other base stations connected to it. The radio network controller 315 is the point of contact for the user equipment 310 towards the communication network 300. The network controller 315 is connected to a core network 316 providing services to the user equipment 310.

The user equipment 310 moves from cell 306 towards the neighbor cell 308. The user equipment 310 uses cell change procedures to move from one cell to another cell when a stronger neighbor cell is detected. When the user equipment 310 uses HS-DSCH it uses a high speed cell change procedure that is modified or regular. A regular cell change procedure is as described above, and the modified cell change procedure is a procedure that may be used only in cells where problems with HSCC performance are monitored.

Figure 2:
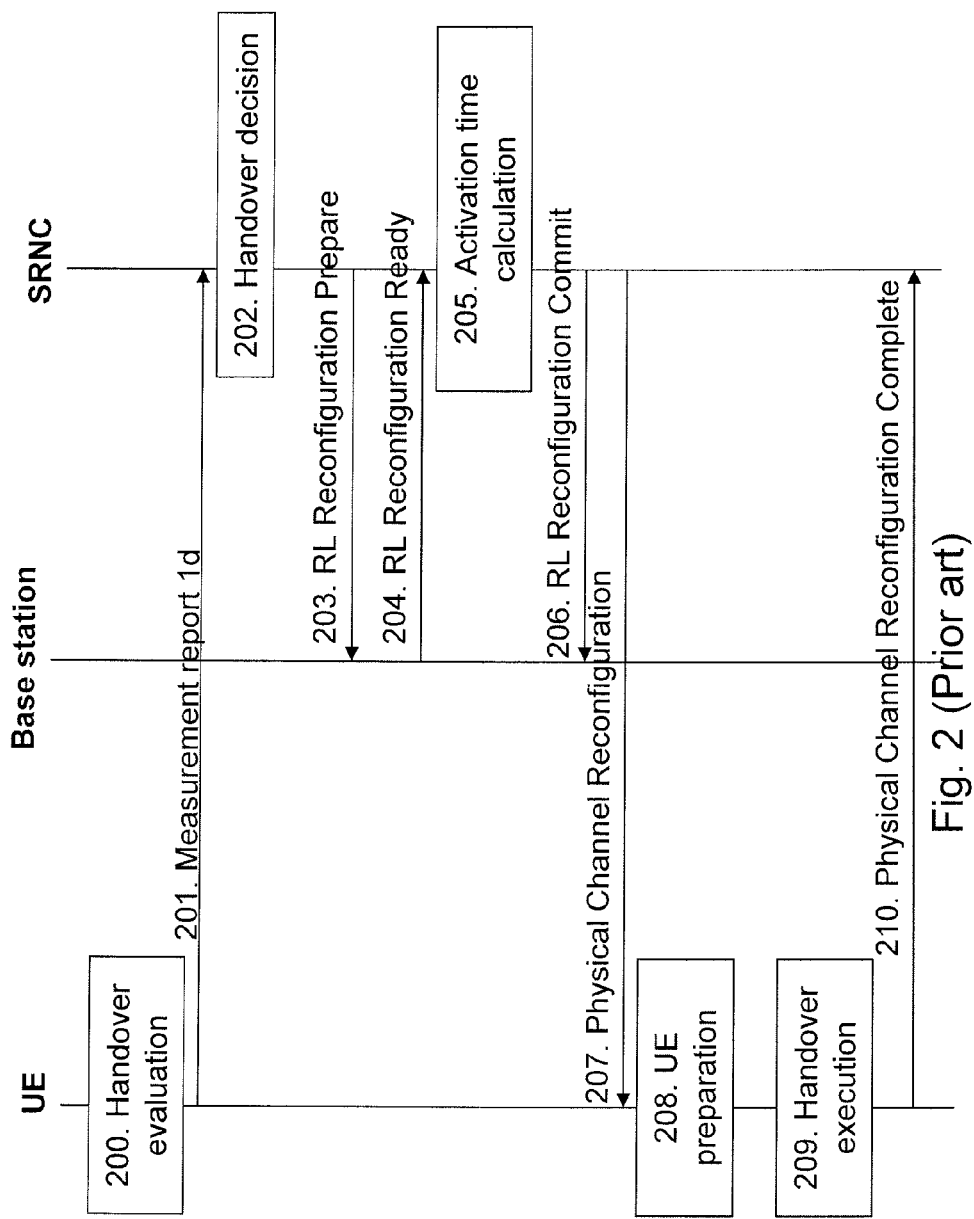
FIG. 2 is a combined flowchart and signalling diagram illustrating a prior art procedure for HS-DSCH serving cell change.

As mentioned above, several improvements, here referred to as modified cell change procedures exist to the high speed serving cell change procedure to reduce drop rates, three of which are shortly described below:

Transmit the handover command in the target cell. In this improvement, the cell change command is transmitted in the target cell as opposed to the serving cell 306 in the regular HS-DSCH serving cell change procedure in FIG. 2. This improves robustness in cases where the quality of the serving cell 306 degrades before the command is transmitted. Transmitting the command in the target cell 308 that was recently reported as strongest cell in the active set improves the probability of successful transmission.

Proactive retransmissions for delay sensitive packets such as signalling radio bearer (SRB) packets. The RRC message including the HS-DSCH serving cell change command is transmitted on SRB. The SRB employs Acknowledged Mode RLC, i.e. RLC retransmissions are supported. Normally, retransmissions are triggered when the receiver detects a missing packet and sends a STATUS report to the transmitter, or when a poll timer expires on the transmitter side. However, this retransmission procedure increases delay, and in the case of a deteriorating serving cell 306, chances of successful retransmissions is reduced over time. Thus, if the transmitter would proactively perform retransmissions of SRB packet, e.g. in consecutive TTIs, the robustness of the HS-DSCH cell change command would be increased. A drawback of this scheme is however that the resource consumption is also increased as many of the proactive retransmissions would be unnecessary.

Bi-casting handover commands from both the serving Node B and the target Node B. This improvement is similar to the first improvement. Here, the HS cell change command is transmitted in both source 306 and target cell 308, to maximize probability of successful transmission. Compared to the first improvement, this should give even higher robustness to changes in source 306 and target cell 308 quality from the time the measurement report is generated to the time the HS cell change command is transmitted.

All these improvements apply to the cell change procedures in all cells and are here as mentioned above referred to as modified cell change procedures. However, the present solution applies the modified cell change procedure only to certain cells. A modified cell change procedure applied only to certain cells, e.g. cells in which certain performance problems have been detected. In this way, such improvements are used only in cells where problems with cell change performance are monitored which improves the cell change reliability in difficult cells, and thus the cost of the improvements in terms of system capacity is minimized.

In the cell change procedure, the user equipment 310 uses a list of active set of cells. The list of active set of cells comprises a list of cells to which the user equipment 310 can move from the serving cell 306.

Figure 4:
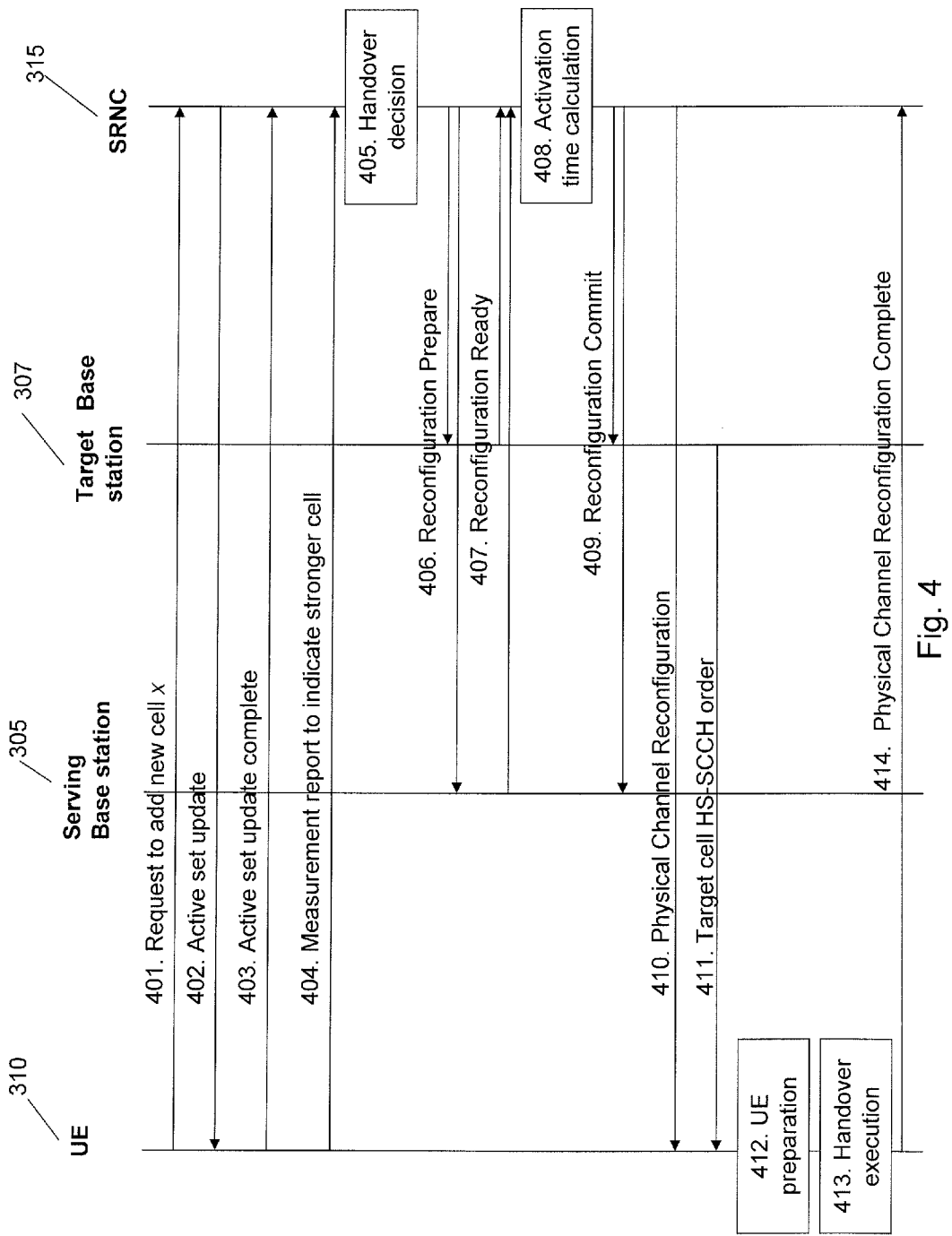
FIG. 4 is a combined flowchart and signalling diagram depicting a method for configuring a cell change procedure to be used for handover.

FIG. 4 is a combined flowchart and signalling diagram depicting an example of a method for configuring a cell change procedure to be used for handover. The method comprises the following steps:

Step 401

The user equipment 310 sends a request to the network controller 315 to add a new cell, a new cell x, that may be a stronger cell to the active set. The new cell x may e.g. be cell 308. This step may be performed in the same way as in prior art described above.

The request may be triggered by measurements on a common pilot (CPHICH), and where the trigger comprises a hysteresis to be fulfilled over a certain time period (time to trigger).

Step 402

As a response to the request in step 401, the network controller 315 sends an active set update message, e.g. of the radio resource control (RRC), to the user equipment 310. The active set update message comprises information about adding cell x to the list of active set of cells stored in the user equipment 310. To improve cell change reliability in difficult cells, the active set update message further indicates whether the modified or the regular cell change procedure shall be used in the target cell 308. The active set update message may in one embodiment of the present solution comprise an information element comprising a list of all neighbouring cells for which the modified cell change procedure shall be used. Alternatively, a new information element may be added for each cell in the list of added cells, indicating whether the modified or the regular cell change procedure shall be used in corresponding cell. In some embodiments, this may be signalled by including an information element "Target cell preconfiguration information" to the corresponding "Radio link addition information". The target cell preconfiguration information may also include information needed by the user equipment 310 to access the target cell 308. An information element is a field in a radio resource control message, carrying information.

The network controller 315 may for example use a log of dropped calls stored in the network controller 315, since a dropped call in a cell might imply problems in that cell that would require the use of a modified cell change procedure for a hard handover to that target cell 308.

Step 403

The user equipment 310 sends an active set update complete message 403 to the network controller 315 confirming that the active set update was complete.

Step 404

When the user equipment 310 has completed the active set update procedure it may send, e.g. via radio resource control signalling, to the network controller 315, a measurement report indicating the presence of a "stronger cell", which in this example is cell 308. The trigger to send the report may for example be event 1d, i.e. that the user equipment 310 has measured higher signal strength of a common pilot channel level (CPICH) in the neighbour cell 308 comprised in the active set of cells, than in that of the current serving cell 306. Before the user equipment 310 transmits the measurement report 1d, it determines if the target cell 308 is configured for modified cell change procedure or regular cell change procedure by detecting/matching if the target cell 308 is present on the previously received list of cells in which modified cell change procedure is used. The contents of the measurement report may differ depending on whether the modified or regular cell change procedure is to be used.

In an alternative embodiment, the information of whether modified or regular cell change procedure is applied in a particular cell is broadcasted to user equipments 310 in a system information block (SIB) of the broadcast control channel (BCCH). As for the active set update case, an information element is then added containing a list of neighbouring cells for which the modified cell change procedure shall be used in handover.

Step 405

The network controller 315 receives the measurement report, and may perform a handover decision based on the received measurement report.

Step 406

The network controller 315 may then configure the serving base station 305 and the target base station 307 with the new configuration, and configures the Iub transport bearer. The network controller 315 may perform this by sending a radio link reconfiguration prepare message to both serving 305 and target base station 307.

Step 407

The network controller 315 may receive in return a radio link reconfiguration ready message from the serving base station 305 and the target base station 307.

Step 408

When the serving base station 305 and target base station 307 have acknowledged the configuration by sending the reconfiguration ready message, the network controller 315 may calculate the activation time (e.g. $T_{asu}$) for the new configuration in case the switch to the new configuration is a synchronized procedure, meaning that the user equipment 310 and the network controller 315 shall move to the new configuration at the same time. The activation time is relative to a connection frame number (CFN). In the case of unsynchronized procedure, no activation time is used.

Step 409

The network controller 315 may send a radio link reconfiguration commit to the serving and target base stations 305, 307.

Step 410

The network controller 315 may send a physical channel reconfiguration message to the user equipment 310. The message indicates to the user equipment 310 that it shall be configured to the stronger neighbour cell 308.

Step 411

In case the modified cell change procedure is used, the target base station 307 may also schedule the user equipment 310 on the HS-SCCH, thus indicating to the user equipment 310 that the preconfigured cell change is approved by the network controller 315. In this way, the reliability of the cell change procedure is improved in case the source cell signal level has deteriorated, e.g. for fast moving user equipments, or due to street corner effects, or similar.

Step 412

The user equipment 310 prepares a processing, i.e. it reads the reconfiguration message from the network controller 315 or the pre-configuration information in case it received the target cell HS-SCCH order.

Step 413

The user equipment 310 then executes the handover. If the synchronized procedure is used the handover execution is performed at the calculated activation time.

Step 414

The user equipment 310 may send a physical channel reconfiguration complete message to the network controller 315 after the handover has been completed.

Figure 5:
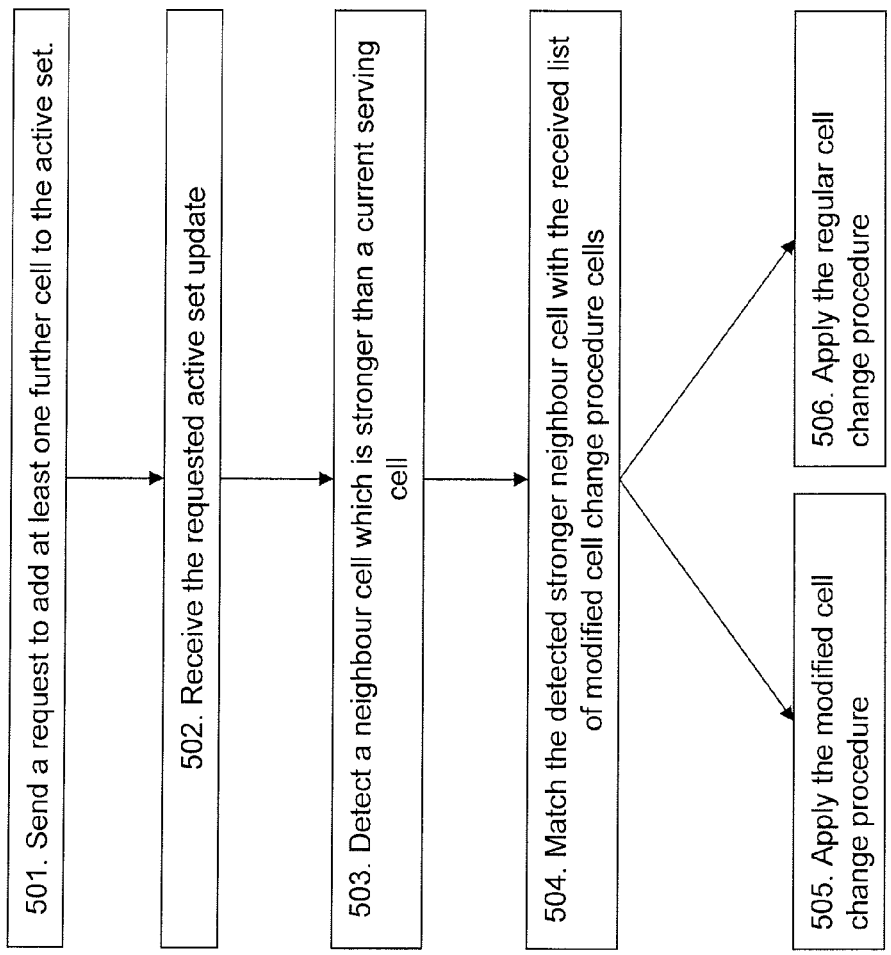
FIG. 5 is a flowchart illustrating embodiments of a method in a user equipment.

The method described above will now be described seen from the perspective of the user equipment 310. FIG. 5 is a flowchart describing the present method in the user equipment 310 for configuring a cell change procedure to be used for handover in a wireless communication network 300. As mentioned above, the user equipment 310 is situated in the serving cell 306. The user equipment 310 comprises a list of active set of cells, the list of active set of cells comprises a list of cells to which the user equipment 310 can move from the serving cell 306. The method comprises the further steps to be performed by the user equipment 310:

Step 501

The user equipment 310 sends a request to the network controller 315 comprised in the wireless communication network 300, to add at least one further cell to the active set.

Step 502

The user equipment 310 receives the requested active set update from the network controller 315. The active set update comprises the list of at least one further cell to be added to the active set and a list of cells to which a modified cell change procedure shall be used for handover.

In some embodiments the active set update message may be transmitted via radio resource control signalling.

In some embodiments, the cell change procedure is a high speed serving cell change procedure.

Step 503

The user equipment 310 detects a neighbour cell 308 which is stronger than a current serving cell 306.

According to some embodiments the stronger cell 308 may be detected by a user equipment 310 measuring a higher signal strength in a neighbour cell 308 compared to that of the current serving cell 306.

In some embodiments the measured signal may be a common pilot.

Step 504

The user equipment then 310 matches the detected stronger neighbour cell 308 with the received list of modified cell change procedure cells.

Step 505

The user equipment 310 applies the modified cell change procedure for the handover to the stronger neighbour cell 308 if the stronger neighbour cell 308 is found matching a cell on the list.

Step 506

This is an optional step. In some embodiments the user equipment 310 may apply a regular cell change procedure for the handover if the stronger neighbour cell 308 is found not matching.

In some embodiments the modified cell change procedure may comprise sending the cell change command over the stronger neighbour cell 308.

In some embodiments, the cells to which a modified cell change procedure is applied may be signalled by including an information element "Target cell preconfiguration information" to the corresponding "Radio link addition information".

Figure 6:
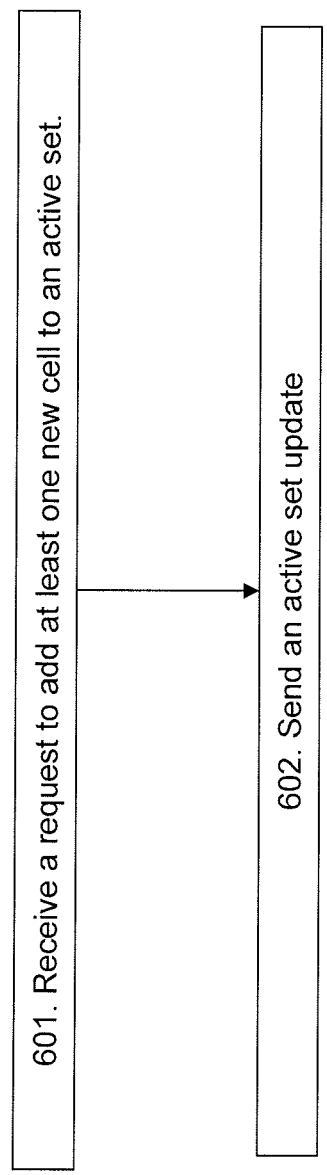
FIG. 6 is a flowchart illustrating embodiments of a method in a network controller.

The method described above will now be described seen from the perspective of the network controller 315. FIG. 6 is a flowchart describing the present method in the network controller 315 for configuring a cell change procedure to be used for handover in a wireless communication network 300. The network controller 315 is connected to a user equipment 310 situated in a serving cell 306. The user equipment 310 comprises an active set of cells, which active set of cells comprises a list of cells to which the user equipment 310 can move from the serving cell 306. The method comprises the further steps to be performed by the network controller 315:

Step 601

The network controller 315 receives a request from a user equipment 315 to add at least one new cell to an active set.

Step 602

The network controller 315 sends an active set update to the user equipment 315. The active set update comprises list of cells to be added to the active set and a list of cells to which a modified cell change procedure shall be used for handover.

Figure 7:
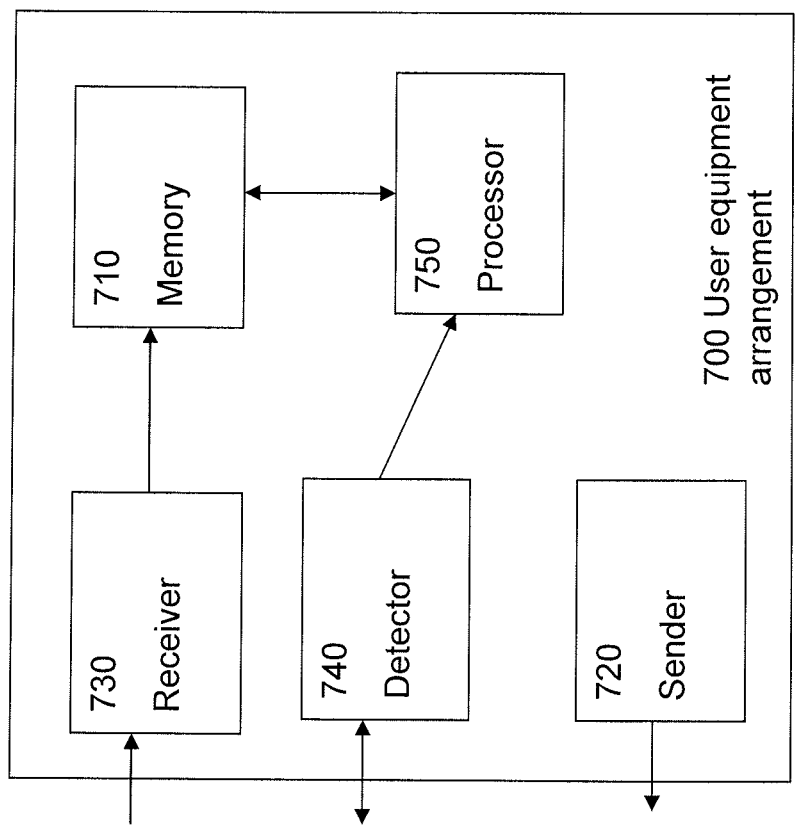
FIG. 7 is a schematic block diagram illustrating embodiments of a user equipment arrangement.

To perform the method steps shown in FIG. 5 for configuring a cell change procedure to be used for handover in a wireless communication network 300 the user equipment 310 comprises a user equipment arrangement 700 as shown in FIG. 7. The user equipment 310 is arranged to be connected to a network controller 315, and the user equipment 310 is situated in a serving cell 306. The user equipment 310 comprises an active set of cells stored in a memory 710, which active set of cells comprises a list of cells to which the user equipment 310 can move from the serving cell 306.

The user equipment arrangement 700 comprises a sender 720 configured to send a request to the network controller 315 through an interface 312 to add at least one further cell to an active set. The user equipment arrangement 700 also comprises a receiver 730 configured to receive an active set update from the network controller 315, the active set update comprising a list of cells to be added to the active set and a list of cells to which a modified cell change procedure shall be used for handover, the lists being stored in the memory unit 710. It also comprises a detector 740 configured to detect a neighbour cell 308 which is stronger than a current serving cell 306, and a processor 750 configured to match the detected stronger neighbour cell 308 with the received list of modified cell change procedure cells and to apply the modified cell change procedure for the handover to the stronger neighbour cell 308 if the stronger neighbour cell is found matching a cell on the list.

Figure 8:
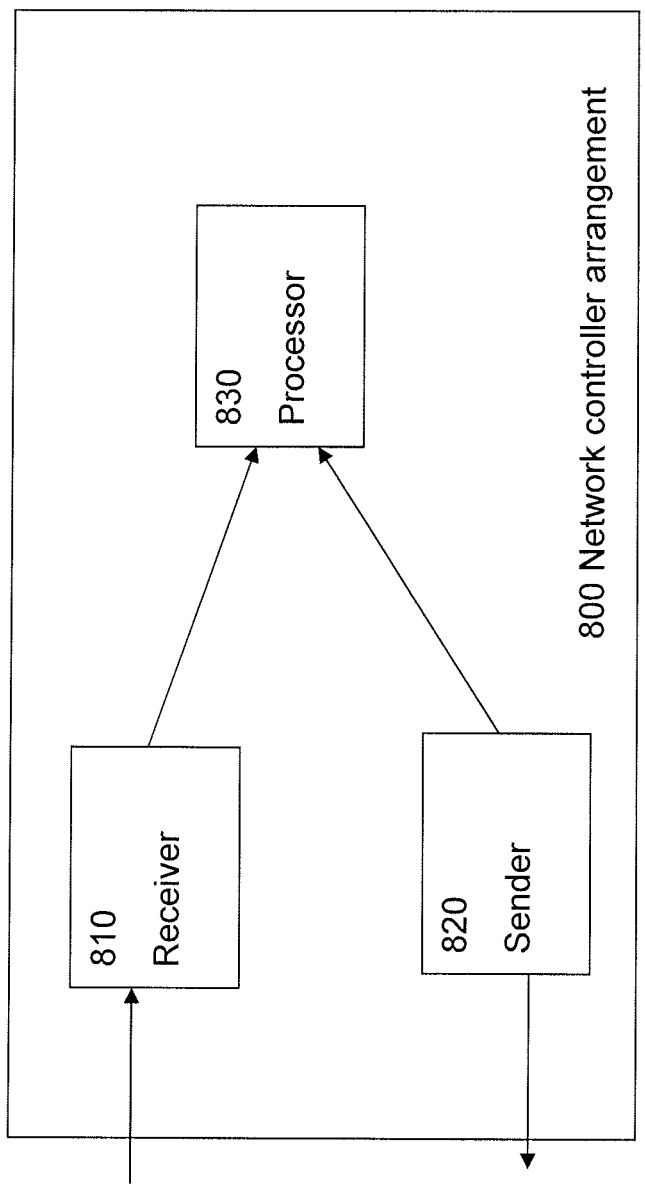
FIG. 8 is a schematic block diagram illustrating embodiments of a network controller.

To perform the method steps shown in FIG. 6 for configuring a cell change procedure to be used for handover in a wireless communication network 300 the network controller 315 comprises a network controller arrangement 800 as shown in FIG. 8. The network controller 315 is arranged to configure a cell change procedure to be used for handover in the wireless communication network 300, and the network controller 315 is arranged to be connected to a user equipment 310 situated in a serving cell 306. The user equipment 310 comprising an active set of cells, which active set of cells comprises a list of cells to which the user equipment 310 can move from the serving cell 306.

The network controller arrangement 800 comprises a receiver 810 configured to receive 601 a request from a user equipment 315 to add at least one further cell to an active set; and a sender 820 configured to send 602 an active set update to the user equipment 315, the active set update comprising a list of cells to be added to the active set and a list of cells to which a modified cell change procedure shall be used for handover.

The present mechanism for configuring a cell change procedure to be used for handover in a wireless communication network may be implemented through one or more processors, such as a processor 750 depicted in FIG. 7, together with computer program code for performing the functions of the present solution. The program code comprises instruction sets for:

sending a measurement report with requests to add at least one further cell to an active set;

receiving an active set update from the network controller 315, the active set update comprising a list of cells to be added to the active set and a list of cells to which a modified cell change procedure shall be used for handover;

detecting a neighbour cell 308 which is stronger than a current serving cell 306;

matching the detected stronger neighbour cell 308 with the received list of modified cell change procedure cells; and for applying the modified cell change procedure for the handover to the stronger neighbour cell 308 if the stronger neighbour cell 308 is found matching a cell on the list.

The program code mentioned above may also be provided as a computer program product, for instance in the form of a data carrier carrying computer program code for performing the present solution when being loaded into the user equipment 310. One such carrier may be in the form of a CD ROM disc. It is however feasible with other data carriers such as a memory stick. The computer program code can furthermore be provided as pure program code on a server and downloaded to the user equipment 310 remotely.

An advantage with the preferred embodiments of the present solution is that cell change improvements can be applied with minimum impact on system capacity.

Means mentioned in the present description can be software means, hardware means or a combination of both.

The described subject matter is of course not limited to the above described embodiments, but can be modified within the scope of the general concept of the solution.

The invention claimed is:

1. A method in a user equipment for configuring a cell change procedure to be used for handover in a wireless communication network, the user equipment being situated in a serving cell and utilizing a list of cells belonging to an active set, said list including cells to which the user equipment can move from the serving cell, the method comprising:
sending a measurement report to a network controller in the wireless communication network that informs the network controller to add at least one further cell to the active set;
receiving, responsive to said measurement report, an active set update from the network controller, the active set update comprising information about the at least one further cell to be added to the active set and an information element indicating whether the at least one further cell is to be added to a list of cells for which a modified cell change procedure shall be used for hand over;
detecting a neighbor cell which is stronger than the serving cell;
determining whether the neighbor cell matches a cell in the list of cells for which the modified cell change procedure shall be used; and
applying the modified cell change procedure for handover to the neighbor cell if the neighbor cell matches a cell on that list.

2. A method according to claim 1, wherein the method further comprises applying a regular cell change procedure for the handover if the neighbor cell does not match a cell on said list of cells for which a modified cell change procedure shall be used.

3. A method according to claim 1, wherein the modified cell change procedure comprises sending a cell change command over the neighbor cell.

4. A method according to claim 1, wherein the active set update message is transmitted via radio resource control signaling.

5. A method according to claim 1, wherein the cells to which a modified cell change procedure is applied is signaled by including an information element "Target cell preconfiguration information" to the corresponding "Radio link addition information".

6. A method according to claim 1, wherein detecting a neighbor cell which is stronger than the serving cell comprises measuring a higher signal strength in the neighbor cell compared to that of the current serving cell.

7. A method according to claim 6, where the measured signal is a common pilot.

8. A method according to claim 1, wherein the cell change procedure is a high speed serving cell change procedure.

9. A method in a network controller for configuring a cell change procedure to be used for handover in a wireless communication network, the network controller arranged to be connected to a user equipment situated in a serving cell, and the user equipment utilizing a list of cells belonging to an active set, said list including cells to which the user equipment can move from the serving cell, the method comprising:
receiving a measurement report from a user equipment informing the network controller to add at least one further cell to an active set; and
sending an active set update to the user equipment, the active set update comprising information about the at least one further cell to be added to the active set and an information element indicating whether the at least one further cell is to be added to a list of cells for which a modified cell change procedure shall be used for handover.

10. A method according to claim 9, wherein the cell change procedure is a high speed serving cell change procedure.

11. A user equipment in a wireless communication network adapted to configure a cell change procedure to be used for handover in the network, the user equipment utilizing a list of cells belonging to an active set, said list including cells to which the user equipment can move from the serving cell, the user equipment comprising:
a sender configured to send a measurement report to a network controller through an interface informing the network controller to add at least one further cell to the active set;
a receiver configured to receive an active set update from the network controller, the active set update comprising information about the at least one further cell to be added to the active set and an information element indicating whether the at least one further cell is to be added to a list of cells for which a modified cell change procedure shall be used for handover;
a detector configured to detect a neighbor cell which is stronger than a serving cell in which the user equipment is situated; and
a processor configured to determine whether the neighbor cell matches a cell in the list of cells for which the modified cell change procedure shall be used, and to apply the modified cell change procedure for handover to the neighbor cell if the neighbor cell matches a cell on that list.

12. A user equipment according to claim 11, wherein the processor is further configured to apply a regular cell change procedure for the handover if the neighbor cell does not match a cell on said list of cells for which a modified cell change procedure shall be used.

13. A user equipment according to claim 11, wherein the modified cell change procedure comprises sending a cell change command over the neighbor cell.

14. A user equipment according to claim 11, wherein the active set update message is transmitted via radio resource control signaling.

15. A user equipment according to claim 11, wherein the cells to which a modified cell change procedure is applied is signaled by including an information element "Target cell preconfiguration information" to the corresponding "Radio link addition information".

16. A user equipment according to claim 11, wherein the detector is configured to detect a neighbor cell which is stronger than the serving cell by measuring a higher signal strength in the neighbor cell compared to that of the serving cell.

17. A user equipment according to claim 16, where the measured signal is a common pilot.

18. A user equipment according to claim 11, wherein the cell change procedure is a high speed serving cell change procedure.

19. A network controller in a wireless communication network adapted to configure a cell change procedure to be used for handover in the network, the network controller also adapted to connect to a user equipment situated in a serving cell, the user equipment utilizing a list of cells belonging to an active set, said list including cells to which the user equipment can move from the serving cell, the network controller comprising a receiver configured to receive a measurement report from the user equipment informing the network controller to add at least one further cell to an active set; and a sender configured to send an active set update to the user equipment, the active set update comprising information about the at least one further cell to be added to the active set and an information element indicating whether the at least one further cell is to be added to a list of cells for which a modified cell change procedure shall be used for handover.

20. The network controller according to claim 19, wherein the cell change procedure is a high speed serving cell change procedure.

21. A computer program product stored in a non-transitory computer-readable memory and comprising a stored computer program for use in a node in a wireless communication network, the program being arranged to configure a cell change procedure to be used for handover in the wireless communication network, the program comprising instruction sets for:

sending a measurement report that informs a network controller in the network to add at least one further cell to an active set;

receiving an active set update from the network controller, the active set update comprising information about the at least one further cell to be added to the active set and an information element indicating whether the at least one further cell is to be added to a list of cells for which a modified cell change procedure shall be used for handover;

detecting a neighbor cell which is stronger than a serving cell in which the node is situated;

determining whether the neighbor cell matches a cell in the list of cells for which a modified cell change procedure shall be used; and for applying the modified cell change procedure for hand over to the neighbor cell if the neighbor cell matches a cell on that list.

* * * * *

UNITED STATES PATENT AND TRADEMARK OFFICE
CERTIFICATE OF CORRECTION

PATENT NO.      : 8,781,476 B2                                   Page 1 of 2
APPLICATION NO. : 12/933220
DATED           : July 15, 2014
INVENTOR(S)     : Wager et al.

It is certified that error appears in the above-identified patent and that said Letters Patent is hereby corrected as shown below:

In the Drawings

Figure 1:
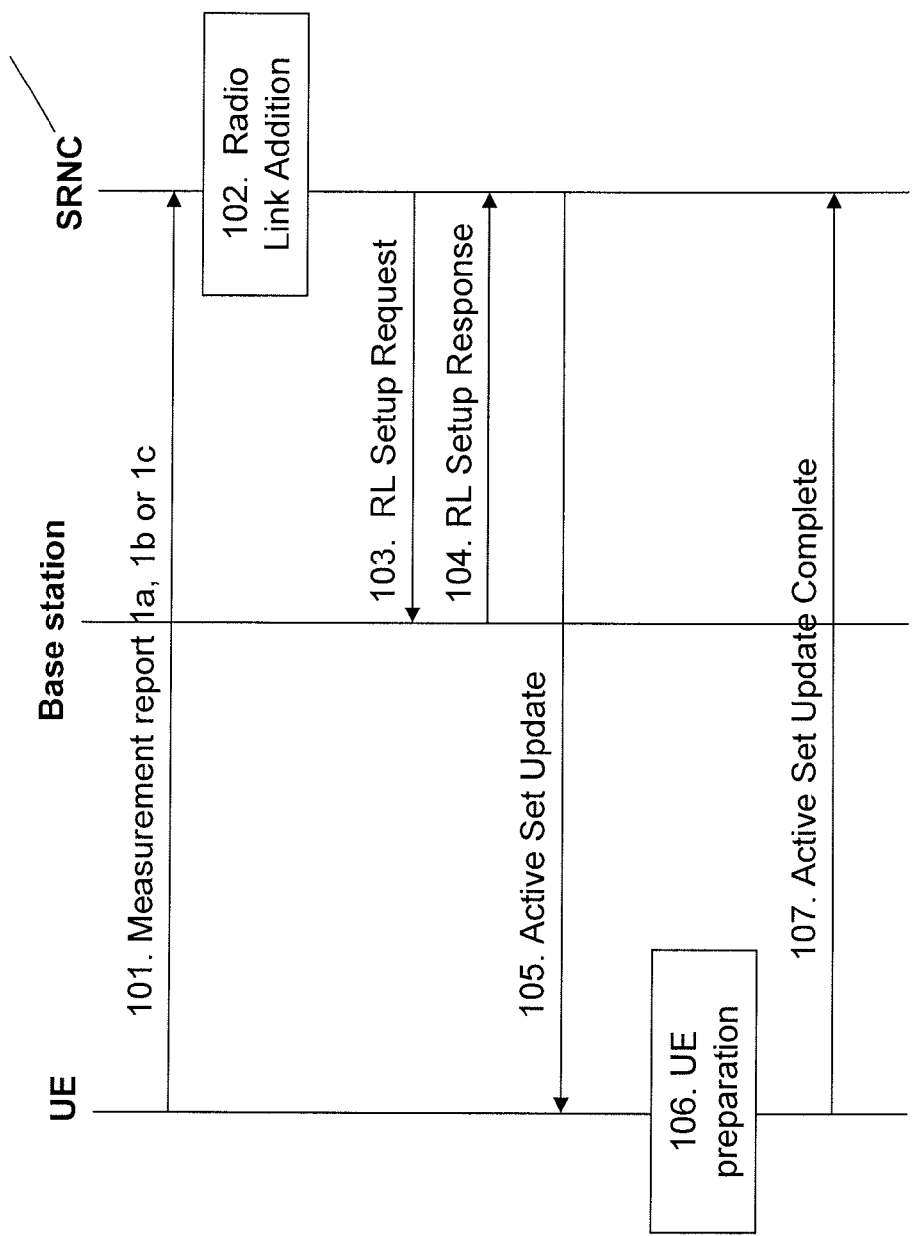
FIG. 1 is a combined flowchart and signalling diagram illustrating a prior art active set update procedure.

In Fig. 1, Sheet 1 of 8, delete "  " and insert -- -- , therefor.

In the Specification

In Column 1, Line 55, delete "common pilot (CPICH)" and insert -- common pilot channel (CPICH) --, therefor.

In Column 2, Line 22, delete "$Tu_{Uu}=Uu$" and insert -- $T_{Uu}=Uu$ --, therefor.

In Column 3, Line 36, delete "Node B" and insert -- Node B. --, therefor.

In Column 3, Line 66, delete "cell" and insert -- cell. --, therefor.

In Column 5, Line 54, delete "comprises" and insert -- comprises: --, therefor.

In Column 6, Lines 13-14, delete "and for" and insert -- and --, therefor.

In Column 6, Line 19, delete "the," and insert -- then, --, therefor.

In Column 8, Lines 59-60, delete "common pilot (CPHICH)," and insert -- common pilot channel (CPICH), --, therefor.

In Column 11, Line 45, delete "315:" and insert -- 315. --, therefor.

Signed and Sealed this
Thirty-first Day of March, 2015

Michelle K. Lee
*Director of the United States Patent and Trademark Office*

CERTIFICATE OF CORRECTION (continued)
U.S. Pat. No. 8,781,476 B2

In Column 11, Lines 47-48, delete "user equipment 315" and insert -- user equipment 310 --, therefor.

In Column 11, Line 51, delete "user equipment 315." and insert -- user equipment 310. --, therefor.

In Column 12, Lines 27-28, delete "user equipment 315" and insert -- user equipment 310 --, therefor.

In Column 12, Line 30, delete "user equipment 315," and insert -- user equipment 310, --, therefor.

In Column 12, Lines 51-52, delete "and for" and insert -- and --, therefor.

In the Claims

In Column 13, Line 52, in Claim 7, delete "where" and insert -- wherein --, therefor.

In Column 14, Line 55, in Claim 17, delete "where" and insert -- wherein --, therefor.

In Column 14, Lines 66-67, in Claim 19, delete "comprising" and insert -- comprising: --, therefor.

In Column 16, Line 15, in Claim 21, delete "and for" and insert -- and --, therefor.